(12) United States Patent
Ogawa

(10) Patent No.: US 11,945,382 B2
(45) Date of Patent: Apr. 2, 2024

(54) SYSTEM, SERVER COMPUTER THEREOF, CONTROL METHOD, AND COMPUTER PROGRAM

(71) Applicant: SUMITOMO ELECTRIC INDUSTRIES, LTD., Osaka (JP)

(72) Inventor: Akihiro Ogawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 863 days.

(21) Appl. No.: 16/981,849

(22) PCT Filed: Mar. 30, 2018

(86) PCT No.: PCT/JP2018/013733
§ 371 (c)(1),
(2) Date: Sep. 17, 2020

(87) PCT Pub. No.: WO2019/187041
PCT Pub. Date: Oct. 3, 2019

(65) Prior Publication Data
US 2021/0096918 A1    Apr. 1, 2021

(51) Int. Cl.
*B60R 16/023* (2006.01)
*G06V 20/56* (2022.01)
*H04W 84/18* (2009.01)

(52) U.S. Cl.
CPC ......... *B60R 16/0231* (2013.01); *G06V 20/56* (2022.01); *H04W 84/18* (2013.01)

(58) Field of Classification Search
CPC ... B60R 16/0231; G06V 20/56; H04W 84/18; G06F 9/5044
See application file for complete search history.

(56) References Cited

U.S. PATENT DOCUMENTS

2019/0025801 A1    1/2019  Suzuki et al.

FOREIGN PATENT DOCUMENTS

| JP | 2003-110749 A | | 4/2003 |
|---|---|---|---|
| JP | 2004-070582 A | | 3/2004 |
| JP | 2004070582 A | * | 3/2004 |
| JP | 2014-165675 A | | 9/2014 |

(Continued)

OTHER PUBLICATIONS

Kozaki et al.; "Technologies for collection and distribution of real time information;" Systems, Control and Information; 2016; pp. 25-31; vol. 60, No. 11.

(Continued)

*Primary Examiner* — Basil T. Jos
(74) *Attorney, Agent, or Firm* — Oliff PLC

(57) ABSTRACT

A system including: one or a plurality of sensors correspondingly connected to each of a plurality of devices; a reception unit configured to receive sensor information corresponding to a detection signal of each of the one or plurality of sensors, the sensor information being transmitted from the plurality of devices; a plurality of processing units configured to process the sensor information received by the reception unit; and a control unit configured to input the sensor information received by the reception unit, to any of the plurality of processing units, on the basis of information about delay in communication of the sensor information.

11 Claims, 9 Drawing Sheets

(56) References Cited

FOREIGN PATENT DOCUMENTS

WO 2017/038100 A1 3/2017

OTHER PUBLICATIONS

Oct. 6, 2020 International Preliminary Report on Patentability issued in International Patent Application No. PCT/JP2018/013733.
Kasei, Ozaki; "Real-Time Information Collection and Distribution Technology," Systems / Control /Information, Japan, General Incorporated System Control Information, Nov. 15, 2016, pp. 25-31, vol. 60, No. 11.
Nov. 30, 2021 Notice of Reasons for Refusal issued in Japanese Patent Application No. 2020-508818.

* cited by examiner

SYSTEM, SERVER COMPUTER THEREOF, CONTROL METHOD, AND COMPUTER PROGRAM

TECHNICAL FIELD

The present invention relates to a system, a server computer, a control method, and a computer program therefor.

BACKGROUND ART

Various types of systems (hereinafter, referred to as driving support system) for supporting a driver in driving of an automobile, a motorcycle, etc. (hereinafter, referred to as vehicle) have been proposed. In the driving support system, sensor information is collected from devices (hereinafter, referred to as roadside devices) set on a road and therearound and provided with various sensor devices (camera, radar, etc.), and the information is analyzed to provide traffic-related information (accident, congestion, etc.) as driving support information to a vehicle. In addition, with increase in speed of a mobile communication line (hereinafter, may be referred to as communication line), it is also proposed to collect information from sensor devices mounted on vehicles, as well as sensor devices provided to roadside devices, and effectively utilize the information for driving support (provide the information as driving support information useful for driving). For example, a standard of cellular V2X has been proposed from a third generation partnership project (3GPP) which promotes standardization of a 3rd-generation mobile communication system and a mobile communication system following this. V means a vehicle and X means anything other than this. The purpose of this standard is to perform communication between a vehicle and anything other than this by long term evolution (LTE) and 5th-generation mobile communication system (5G). The 5G line can achieve a line speed of 100 to 1000 times the speed of LTE line.

Patent Literature 1 shown below discloses technology that, in a system for transmitting sensor information from a plurality of sensors to an information processing device via a communication network, sensor information is transmitted while selecting a desirable communication network in accordance with the situation. In a sensor network, since a wide variety of sensors are used, sensor information also includes a wide variety of information, e.g., information with a large volume or a small volume, information that requires or does not require real-time transmission, and the like. These vary depending on the situation. In order to address this, this system selects a communication network on the basis of at least one of a sensor ID (ID for identifying an individual sensor), the type of the sensor, and the information volume corresponding to sensor information to be transmitted, and transmits the sensor information accordingly.

CITATION LIST

Patent Literature

PATENT LITERATURE 1: Japanese Laid-Open Patent Publication No. 2003-110749

SUMMARY OF INVENTION

A system according to an aspect of the present invention includes: one or a plurality of sensors correspondingly connected to each of a plurality of devices; a reception unit configured to receive sensor information corresponding to a detection signal of each of the one or plurality of sensors, the sensor information being transmitted from the plurality of devices; a plurality of processing units configured to process the sensor information received by the reception unit; and a control unit configured to input the sensor information received by the reception unit, to any of the plurality of processing units, on the basis of information about delay in communication of the sensor information.

A control method according to another aspect of the present invention is a control method for controlling processing for sensor information from one or a plurality of sensors correspondingly connected to each of a plurality of devices, the control method including: a reception step of receiving sensor information corresponding to a detection signal of each of the one or plurality of sensors, the sensor information being transmitted from the plurality of devices; a plurality of processing steps of processing the sensor information received in the reception step; and a control step of inputting the sensor information received in the reception step, to any of the plurality of processing steps, on the basis of information about delay in communication of the sensor information.

A server computer according to still another aspect of the present invention is a server computer that communicates with a plurality of devices, the plurality of devices each including one or a plurality of sensors connected thereto, the server computer including: a reception unit configured to receive sensor information corresponding to a detection signal of each of the one or plurality of sensors, the sensor information being transmitted from the plurality of devices; a plurality of processing units configured to process the sensor information received by the reception unit; and a control unit configured to input the sensor information received by the reception unit, to any of the plurality of processing units, on the basis of information about delay in communication of the sensor information.

A computer program according to still another aspect of the present invention is a computer program for causing a server computer that communicates with a plurality of devices each having one or a plurality of sensors, to implement: a reception function of receiving sensor information corresponding to a detection signal of each of the one or plurality of sensors, the sensor information being transmitted from the plurality of devices; a plurality of processing functions of processing the sensor information received by the reception function; and a control function of inputting the sensor information received by the reception function, to any of the plurality of processing functions, on the basis of information about delay in communication of the sensor information.

DESCRIPTION OF EMBODIMENTS

Problems to be Solved by the Present Invention

In a driving support system, in a case where sensor information is transmitted from an on-vehicle device and a roadside device to a server computer (hereinafter, may be simply referred to as server) and is analyzed by the server, the sensor information arrives at the server with a delay due to a reaction speed of the sensor device, a communication speed of a used line (5G, LTE, etc.), and the like. Therefore, even if plural pieces of sensor information have been received at almost the same time, sensor information different in sensor detection time (time at which sensor information is generated) is mixed therein, and thus there is a problem that it is not appropriate to collectively analyze these pieces of sensor information. The delay time can include delay due to sensor response, delay due to processing in the on-vehicle device, and delay due to communication.

Figure 1:
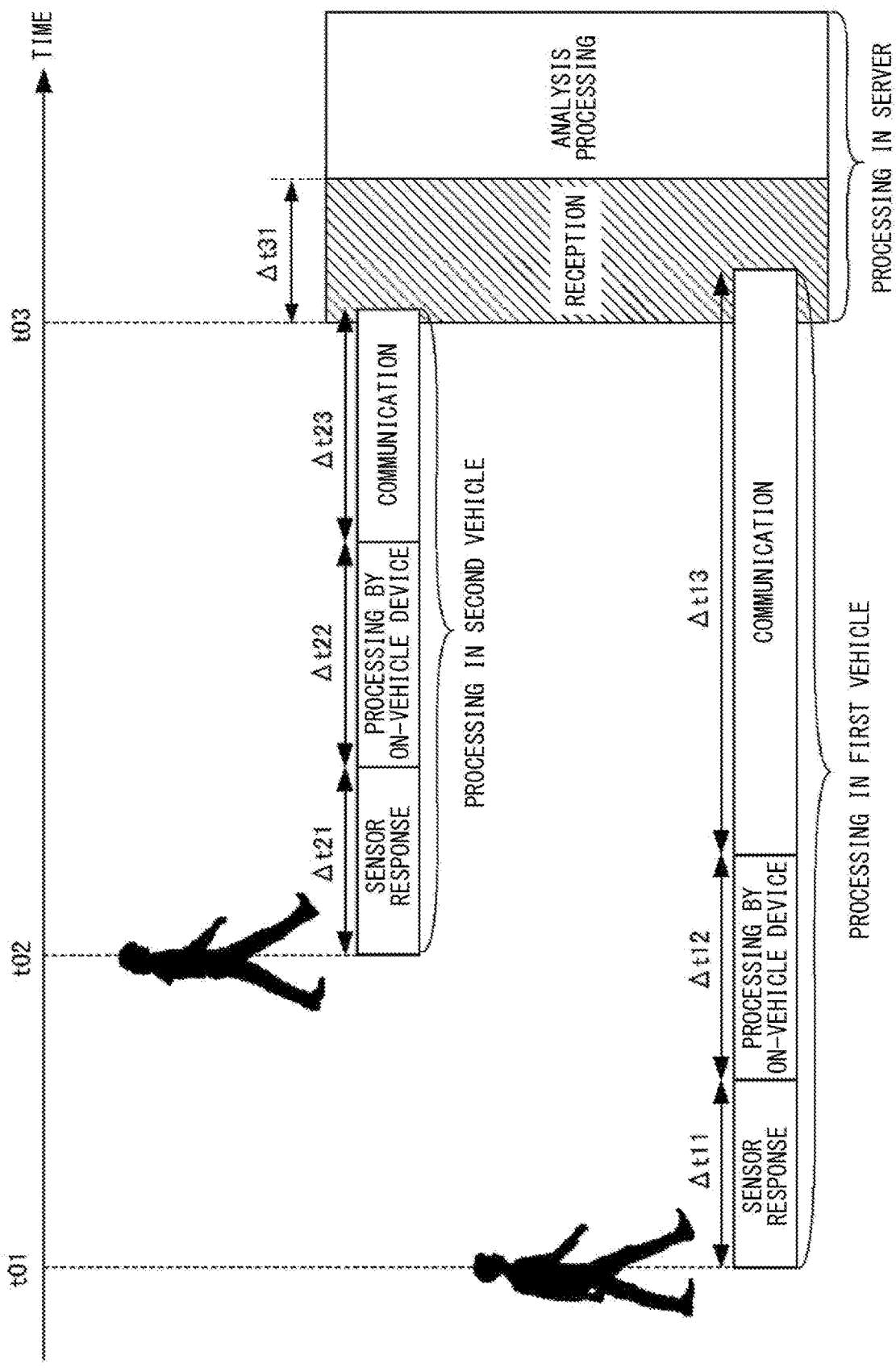
FIG. 1 is a timing chart showing a problem in conventional art.

Specifically, with reference to FIG. 1, a time at the same location is indicated on the horizontal axis (which indicate the order of times but the length in the horizontal axis direction is not proportional to the length of time), and the lower stage indicates processes in the first vehicle from when an object (person) is detected at time t01 and sensor information is generated until the sensor information is received by a server, and time periods required for the respective processes. That is, a sensor response period $\Delta t11$ from when the sensor detects the object (i.e., reacts to the object) until information thereof is inputted as sensor information to the on-vehicle device, a processing period $\Delta t12$ from when the sensor information is inputted to the on-vehicle device until a predetermined process by the on-vehicle device is executed and the sensor information is transmitted, and a communication period $\Delta t13$ from when the sensor information is transmitted from the on-vehicle device until the sensor information is received by the server, constitute a delay time. Similarly, the upper stage indicates processes in a second vehicle different from the first vehicle from when an object (person) different from the above one is detected at time t02 different from the time t01 and sensor information is generated until the sensor information is received by the server, and time periods required for the respective processes. That is, a sensor response period $\Delta t21$ from when the sensor detects the object until information thereof is inputted as sensor information to the on-vehicle device, a processing period $\Delta t22$ from when the sensor information is inputted to the on-vehicle device until a predetermined process by the on-vehicle device is executed and the sensor information is transmitted, and a communication period $\Delta t23$ from when the sensor information is transmitted from the on-vehicle device until the sensor information is received by the server, constitute a delay time. The pieces of sensor information received by the server during a predetermined time width $\Delta t31$ (hereinafter, referred to as same time) from the time t03 are collectively treated as analysis targets, to be subjected to predetermined analysis processing. The analysis result is stored in a storage device (memory, hard disk, etc.) of the server, and is read as necessary, to be transmitted as driving support information to each vehicle.

The pieces of sensor information at the upper stage and the lower stage in FIG. 1 are received at the same time and are treated as analysis targets, but the object (person) detected by the sensor of the first vehicle and the object (person) detected by the sensor provided to the second vehicle are different from each other, and their detection times are also different from each other. Despite this, if these pieces of sensor information are treated as the same processing target, for example, different objects are erroneously detected as the same object, so that an erroneous detection result is obtained. Similarly, in a case where the same object is detected by a plurality of different on-vehicle devices, if their delay times are greatly different from each other, these detection results are not received at almost the same time by the server and thus are treated as different processing targets, leading to reduction in accuracy of an analysis result.

At present, LTE line comparatively widely spreads in Japan, but 5G line is limited to stations of major cities and downtown areas and is yet to spread. Some of on-vehicle devices support LTE line but do not support 5G line. In addition, even in an on-vehicle device that can support 5G line and LTE line, it is expected that switching between 5G line and LTE line frequently occurs. Therefore, even if pieces of sensor information are transmitted from on-vehicle devices to a server and are received at the same time by the server, their delay times might be greatly different from each other. This problem can occur not only in the case of 5G line and LTE line, but also between communication lines that are greatly different in the specifications of line speed. Further, even in a case of using the same communication line, the line speed can greatly change in accordance with the traveling environment (traveling location, traveling time, etc.) of the vehicle. Therefore, also in the case of using the same line, the above problem can occur. The technology disclosed in Patent Literature 1 cannot solve such a problem.

Accordingly, an object of the present invention is to provide a system, a server computer, a control method, and a computer program therefor which are capable of, when sensor information is transmitted from an on-vehicle device and a roadside device to a server, appropriately classifying and analyzing the sensor information in accordance with delay times, so that the sensor information can be used as driving support information.

Effects of the Present Invention

According to the present invention, a server can generate driving support information with high accuracy from received sensor information and provide the driving support information to an on-vehicle device.

Description of Embodiments of the Present Invention

Contents of embodiments of the present disclosure are listed and described. The embodiments described below may be, at least partially, freely combined with each other.

(1) A system according to a first aspect of the present invention includes: one or a plurality of sensors correspondingly connected to each of a plurality of devices; a reception unit configured to receive sensor information corresponding to a detection signal of each of the one or plurality of sensors, the sensor information being transmitted from the plurality of devices; a plurality of processing units configured to process the sensor information received by the reception unit; and a control unit configured to input the sensor information received by the reception unit, to any of the plurality of processing units, on the basis of information about delay in communication of the sensor information.

Thus, the server can appropriately classify and analyze sensor information in accordance with a delay time in transmission of the sensor information from the on-vehicle device, the roadside device, etc. to the server, whereby an analysis result with high reliability can be obtained.

(2) Preferably, the information about the delay includes: at least one of information about a sensing time of the sensor and information about an acquisition time of the sensor information by the device to which the sensor is connected; and information about a reception time by the reception unit. Thus, the server can accurately calculate the delay time of each received sensor information, and can more appropriately classify and analyze the sensor information.

(3) More preferably, the information about the delay further includes information about an acquisition time of the sensor information by the device to which the sensor is connected and information about a transmission time of the sensor information from the device to the reception unit. Thus, the server can even more accurately calculate the delay time of each received sensor information, and can even more appropriately classify and analyze the sensor information.

(4) Further preferably, the plurality of processing units include a moving object processing unit for detecting a moving object from the sensor information, and another processing unit, and the control unit compares the information about the delay with a moving object processing threshold, and determines, on the basis of a result of the comparison, whether to input the sensor information to the moving object processing unit or to the processing unit other than the moving object processing unit. Thus, the server can perform the moving object processing on sensor information that has a small delay time and is suitable for moving object detection.

(5) Preferably, the plurality of processing units include an estimation processing unit for estimating an attribute of an object detected from the sensor information, and another processing unit, and the control unit compares the information about the delay with an estimation processing threshold, and determines, on the basis of a result of the comparison, whether to input the sensor information to the estimation processing unit or to the processing unit other than the estimation processing unit. Thus, if the estimation processing threshold is set to be slightly greater than the moving object processing threshold, the server can perform the estimation processing on sensor information having a slightly great delay time about the detected object, in addition to sensor information having a small delay time.

(6) More preferably, the plurality of processing units include a statistical processing unit for statistically analyzing the sensor information, and another processing unit, and the control unit compares the information about the delay with a statistical processing threshold, and determines, on the basis of a result of the comparison, whether to input the sensor information to the statistical processing unit or to the processing unit other than the statistical processing unit. Thus, if the statistical processing threshold is set to be greater than both of the moving object processing threshold and the estimation processing threshold, the server can perform the statistical processing on sensor information having a comparatively great delay time, in addition to sensor information having a small delay time and sensor information having a slightly great delay time about the detected object.

(7) Further preferably, the plurality of devices include at least one of an on-vehicle device and a roadside device. Thus, the server can generate appropriate driving support information.

(8) Preferably, the above system further includes a synchronous processing unit configured to group, among processing results of the plurality of processing units, the processing results for which sensing times of the sensors corresponding to the processing results or acquisition times of sensor information corresponding to the processing results are close to each other, into one group, in order to perform integration processing for the processing results of the plurality of processing units. Thus, the server can provide more appropriate driving support information to the on-vehicle device.

(9) A control method according to a second aspect of the present invention is a control method for controlling processing for sensor information from one or a plurality of sensors correspondingly connected to each of a plurality of devices, the control method including: a reception step of receiving sensor information corresponding to a detection signal of each of the one or plurality of sensors, the sensor information being transmitted from the plurality of devices; a plurality of processing steps of processing the sensor information received in the reception step; and a control step of inputting the sensor information received in the reception step, to any of the plurality of processing steps, on the basis of information about delay in communication of the sensor information. Thus, the server can appropriately classify and analyze sensor information in accordance with a delay time in transmission of the sensor information from the on-vehicle device, the roadside device, etc. to the server, whereby an analysis result with high reliability can be obtained.

(10) A server according to a third aspect of the present invention is a server computer that communicates with a plurality of devices, the plurality of devices each including one or a plurality of sensors connected thereto, the server computer including: a reception unit configured to receive sensor information corresponding to a detection signal of each of the one or plurality of sensors, the sensor information being transmitted from the plurality of devices; a plurality of processing units configured to process the sensor information received by the reception unit; and a control unit configured to input the sensor information received by the reception unit, to any of the plurality of processing units, on the basis of information about delay in communication of the sensor information. Thus, the server can appropriately classify and analyze sensor information in accordance with a delay time in transmission of the sensor information from the on-vehicle device, the roadside device, etc. to the server, whereby an analysis result with high reliability can be obtained.

(11) A computer program according to a fourth aspect of the present invention is a computer program for causing a server computer that communicates with a plurality of devices each having one or a plurality of sensors, to implement: a reception function of receiving sensor information corresponding to a detection signal of each of the one or plurality of sensors, the sensor information being transmitted from the plurality of devices; a plurality of processing functions of processing the sensor information received by the reception function; and a control function of inputting the sensor information received by the reception function, to any of the plurality of processing functions, on the basis of information about delay in communication of the sensor information. Thus, the server can appropriately classify and analyze sensor information in accordance with a delay time in transmission of the sensor information from the on-vehicle device, the roadside device, etc. to the server, whereby an analysis result with high reliability can be obtained.

Details of Embodiment of the Present Invention

In the following embodiments, the same components are denoted by the same reference characters. The same applies to the names and the functions thereof. Therefore, detailed description thereof will not be given repeatedly.

Embodiments

Entire Configuration

Figure 2:
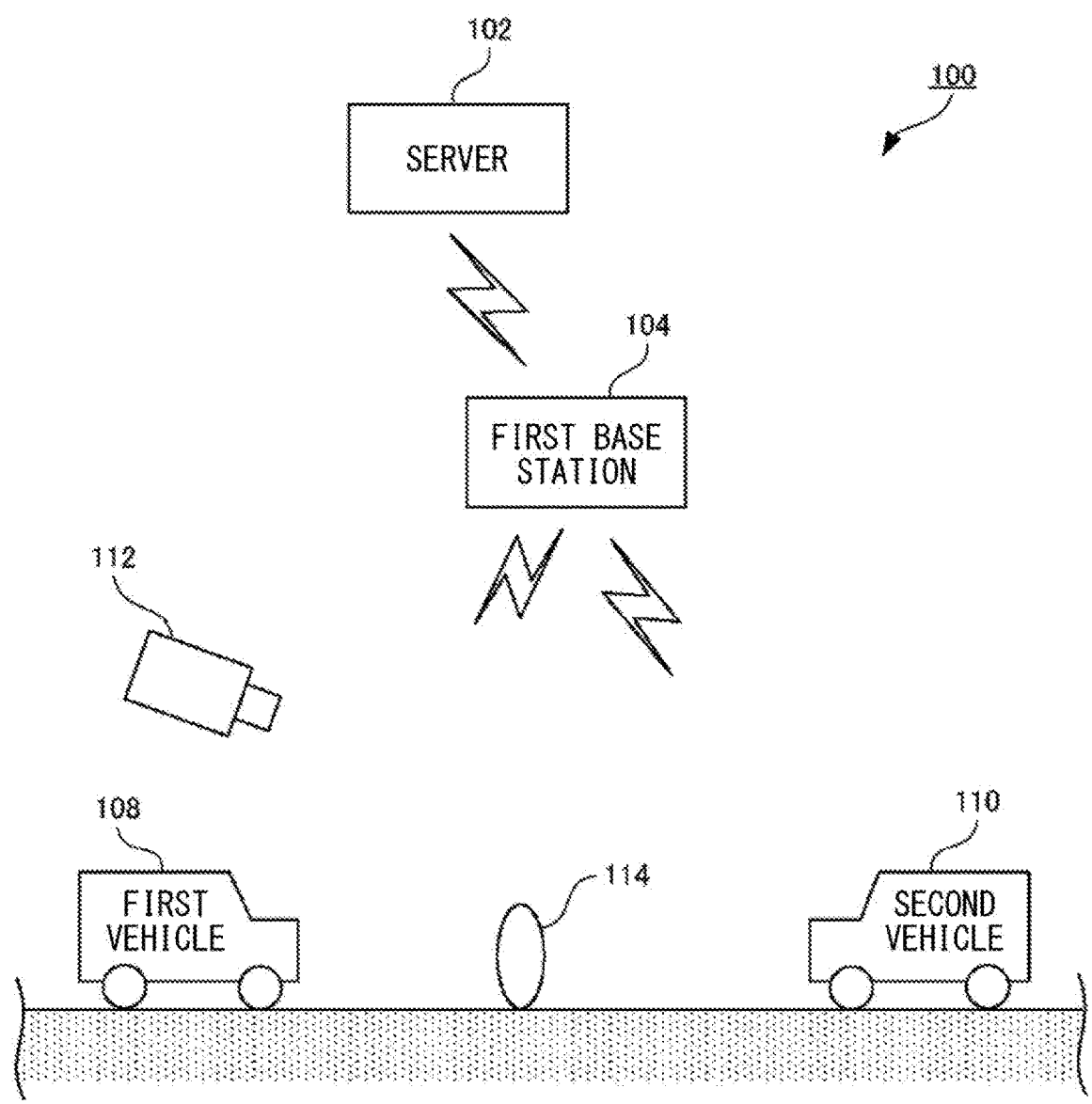
FIG. 2 is a schematic view showing the configuration of a driving support system according to an embodiment of the present invention.

With reference to FIG. 2, a driving support system 100 according to an embodiment of the present invention includes a server 102, a first base station 104, a first vehicle 108, a second vehicle 110, and a roadside device 112. The server 102 provides information (hereinafter, referred to as driving support information) useful for driving, to on-vehicle devices of the first vehicle 108 and the second vehicle 110, to support respective drivers thereof. Communication between elements constituting the driving support system 100 is performed via known mobile communication lines. The first base station 104 provides a service by LTE line and 5G line.

The on-vehicle device mounted on the first vehicle 108 has communication functions using LTE line and 5G line. On the other hand, the on-vehicle device mounted on the second vehicle 110 has a communication function using LTE line but does not have a communication function using 5G line. The roadside device 112 is a device installed on a road or therearound and provided with a sensor, and has a function for communicating with the server 102. The roadside device 112 is, for example, a digital camera. A detection object 114 is an object to be detected by on-vehicle sensors of the first vehicle 108 and the second vehicle 110, and the sensor of the roadside device, and is, for example, a person, a traffic signal unit, or a building.

In FIG. 2, one base station is shown as a representative, but the number thereof is not limited thereto. Normally, a plurality of base stations are provided. Also regarding vehicles, two vehicles are shown as representatives in FIG. 2. However, without limitation thereto, the server 102 can communicate with on-vehicle devices of more vehicles, collect and analyze information, and provide driving support information. In addition, also regarding the roadside device 112, a plurality of roadside devices are provided normally.

Hardware Configuration of On-Vehicle Device

Figure 3:
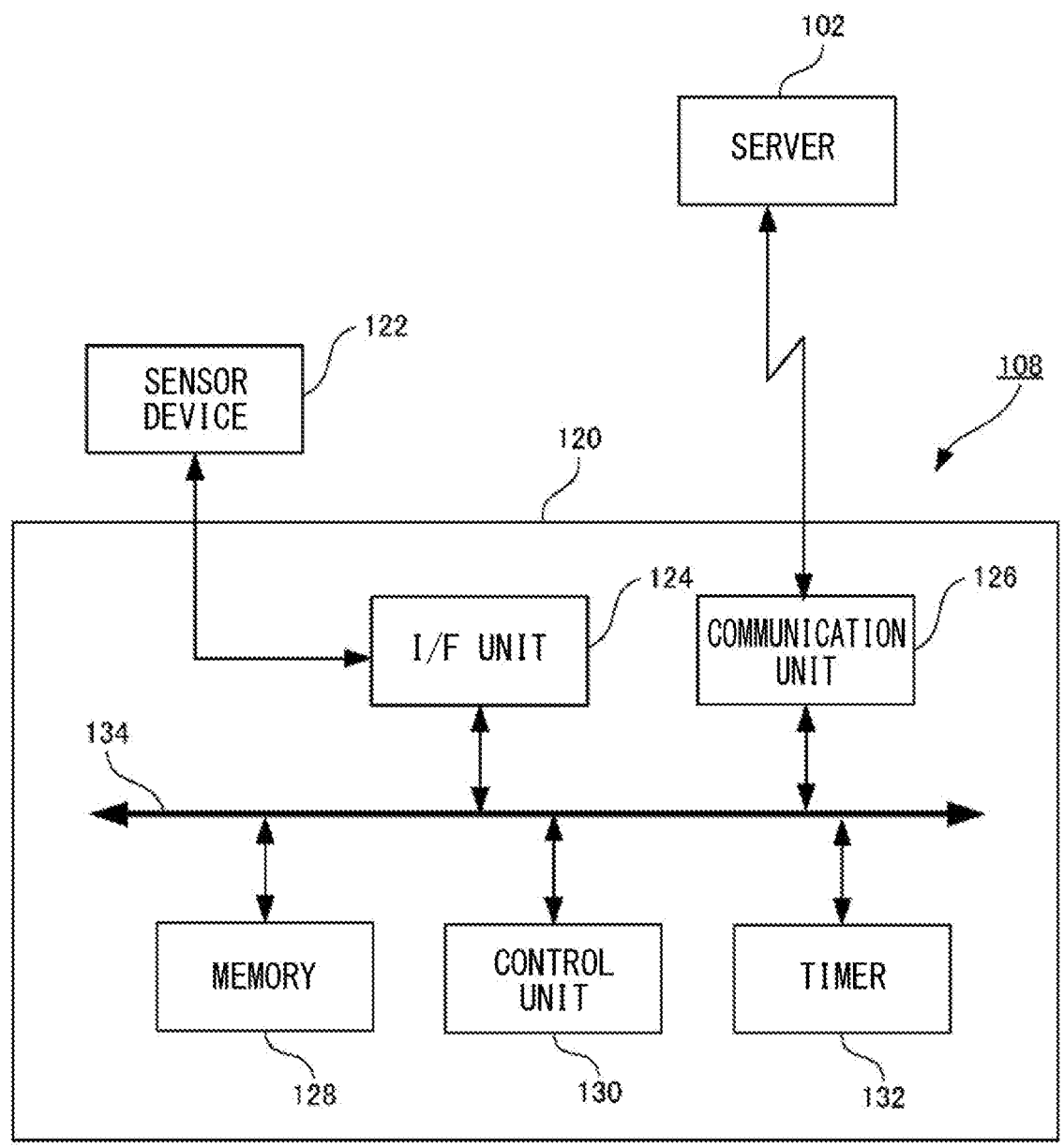
FIG. 3 is a block diagram showing a hardware configuration of an on-vehicle device.

With reference to FIG. 3, an example of a hardware configuration of an on-vehicle device 120 mounted on the first vehicle 108 will be shown. The on-vehicle device 120 includes an interface unit (hereinafter, referred to as I/F unit) 124 connected to a sensor device 122, a communication unit 126 for performing communication, a memory 128 for storing data, a control unit 130 for controlling these components, a timer 132, and a bus 134 for transferring data between these components.

The sensor device 122 is a known sensor mounted on the first vehicle 108. The vehicle is provided with various sensors, and among these, the sensor device 122 is the one that serves to generate driving support information. The sensor device 122 is, for example, a digital camera (CCD camera, CMOS camera), a radar (millimeter wave radar, laser radar), or the like. The sensor device 122 senses an object and outputs a predetermined detection signal (analog signal or digital data).

The detection signal from the sensor device 122 is inputted to the I/F unit 124. The I/F unit 124 includes an A/D conversion unit, and when an analog signal is inputted, samples the analog signal at a predetermined frequency, and generates and outputs digital data (sensor information). The generated digital data is sent to the memory 128 and stored therein. If the output signal from the sensor device 122 is digital data, the I/F unit 124 stores the inputted digital data in the memory 128. The memory 128 is, for example, a rewritable nonvolatile semiconductor memory, or a hard disk drive (hereinafter, referred to as HDD).

The communication unit 126 has communication functions using LTE line and 5G line, and performs communication with the server 102. Communication between the on-vehicle device 120 and the server 102 is performed via the first base station 104. The communication unit 126 is composed of an IC for performing modulation and multiplexing adopted for each of LTE line and 5G line, an antenna for radiating and receiving radio waves having a predetermined frequency, an RF circuit, and the like.

The control unit 130 includes a central processing unit (CPU), and controls corresponding components to implement functions of the on-vehicle device 120 described later. The timer 132 outputs information (hereinafter, simply referred to as present time) indicating the present time.

The on-vehicle device of the second vehicle 110 basically has the same configuration as the on-vehicle device 120. However, the on-vehicle device of the second vehicle 110 is different from the on-vehicle device 120 in that the communication unit of the on-vehicle device of the second vehicle 110 has a communication function using LTE line but does not have a communication function using 5G line.

Hardware Configuration of Roadside Device

Also the roadside device 112 basically has the same configuration as the on-vehicle device 120, and uploads sensor information (e.g., video image) acquired from the sensor, to the server 102. The communication function of the roadside device 112 may be any type. The communication function may be a communication function using 5G line or LTE line, or may be a communication function using a wireless LAN such as WiFi (registered trademark). It is noted that, in a case of WiFi communication, a device (wireless router, etc.) for providing a WiFi service is provided separately from the first base station 104 for mobile communication, and the roadside device 112 communicates with the server 102 via the Internet. Here, it is assumed that the roadside device 112 has a communication function using 5G line.

Hardware Configuration of Server

Figure 4:
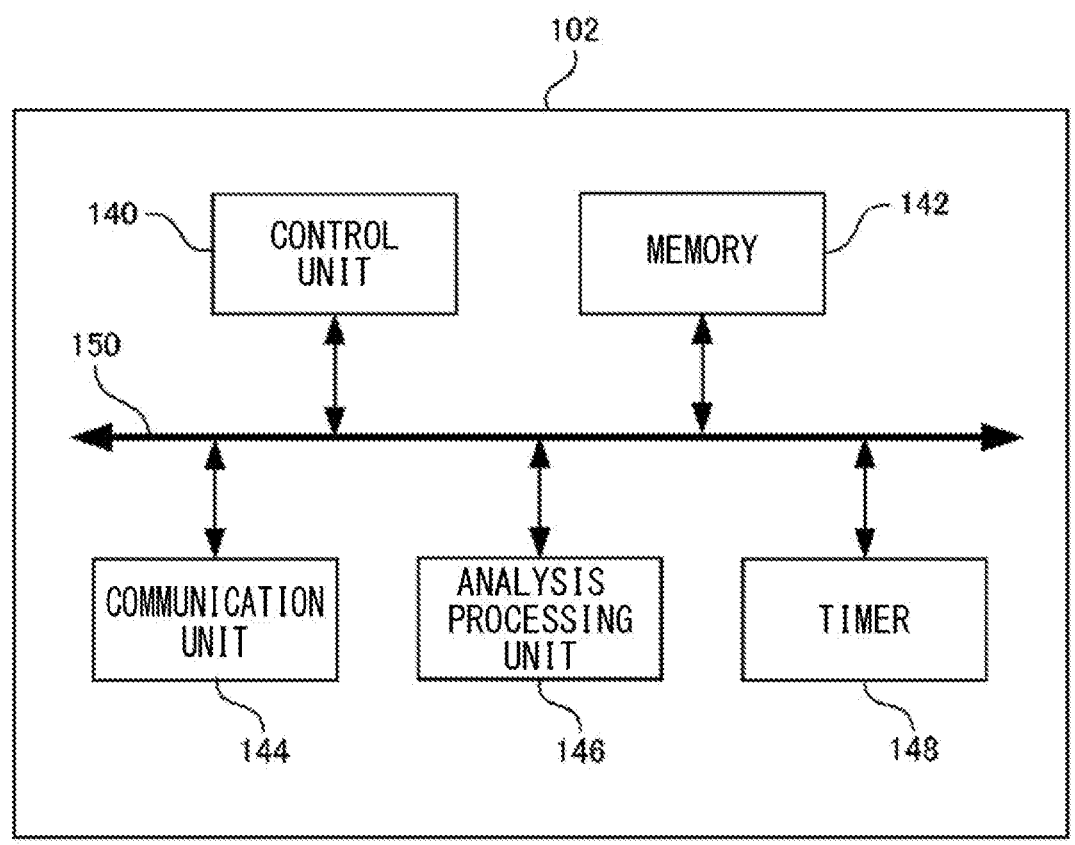
FIG. 4 is a block diagram showing a hardware configuration of a server.

With reference to FIG. 4, the server 102 includes a control unit 140, a memory 142, a communication unit 144, an analysis processing unit 146, a timer 148, and a bus 150. Data transfer between these components is performed via the bus 150. The control unit 140 includes, for example, a CPU, and controls corresponding components to implement various functions of the server 102. The communication unit 144 receives, via the first base station 104, sensor information uploaded from the on-vehicle devices of the first vehicle 108 and the second vehicle 110 and sensor information uploaded from the roadside device 112 installed on a road or the like. The memory 142 includes a rewritable nonvolatile semiconductor memory and a large-capacity storage device such as HDD. Data received by the communication unit 144 is transferred to the memory 142 so as to be stored as a database. The analysis processing unit 146 reads data from the memory 142 as appropriate, executes predetermined analysis processing (e.g., analysis for obtaining driving support information), and stores a result thereof in the memory 142.

Functional Configuration of Server

Figure 5:
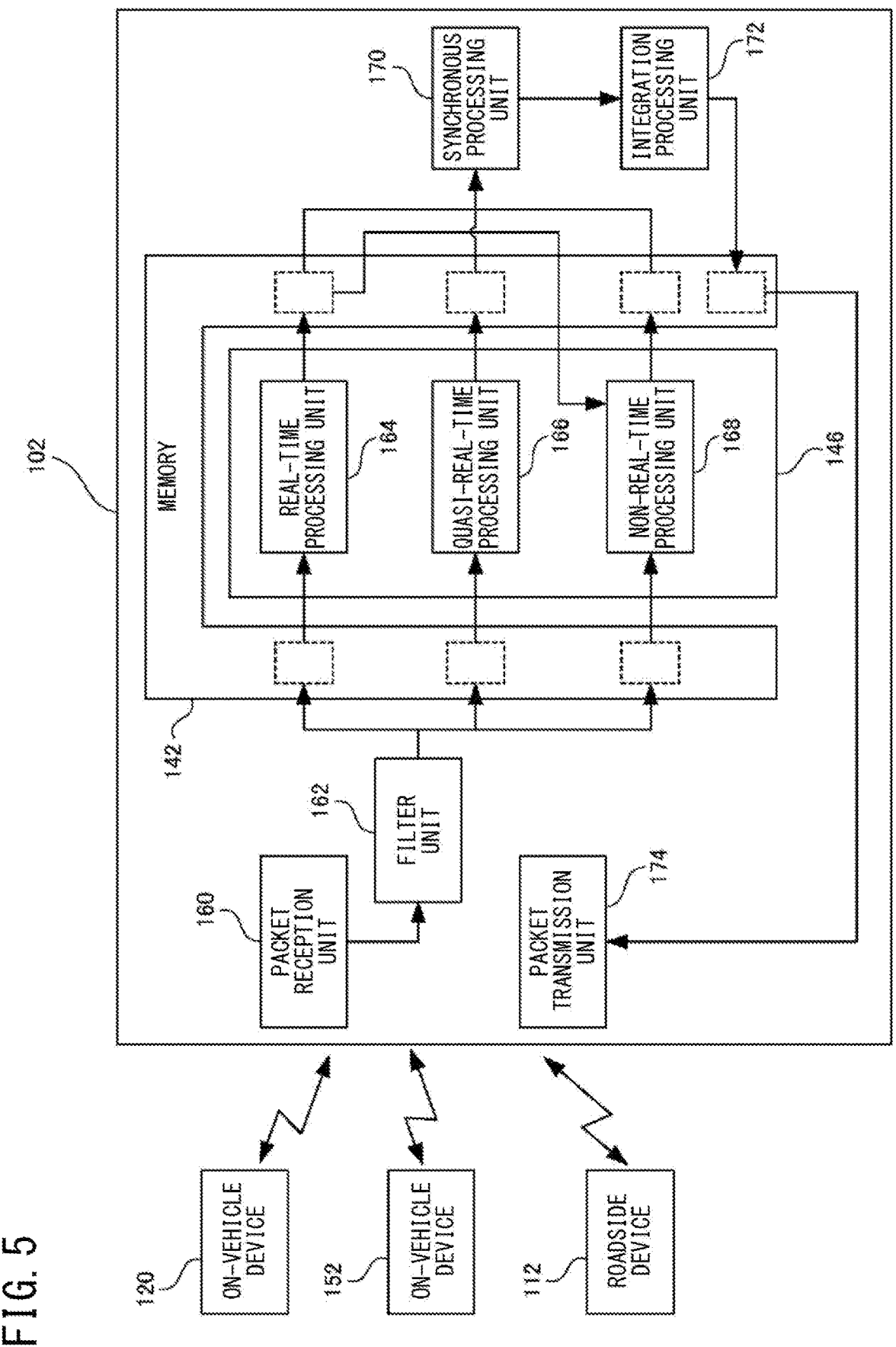
FIG. 5 is a block diagram showing a functional configuration of the server.

With reference to FIG. 5, the function of the server 102 will be described. The server 102 includes a packet reception unit 160 for receiving packet data, a filter unit 162 for classifying output data (sensor information) from the packet reception unit 160 in accordance with a predetermined condition, an analysis processing unit 146 for executing predetermined processing on the classified data, a synchronous processing unit 170 for grouping output data from the analysis processing unit 146 in accordance with a predetermined condition, an integration processing unit 172 for performing integration processing for the grouped data, a memory 142 for storing a processing result from the integration processing unit 172, and a packet transmission unit 174 for reading data from the memory 142, generating packet data, and transmitting the same.

When the packet reception unit 160 has received packet data including sensor information transmitted from the on-vehicle device 120 of the first vehicle 108, the on-vehicle device 152 of the second vehicle 110, or the roadside device 112, the packet reception unit 160 extracts the sensor information and time information (timestamp) added thereto, and outputs them to the filter unit 162. The function of the packet reception unit 160 is implemented by the communication unit 144 shown in FIG. 4.

Using the time information among the inputted sensor information and time information, the filter unit 162 calculates a delay time from when the sensor information has been acquired until the sensor information is received by the server 102, and classifies the sensor information on the basis of the calculated delay time. The analysis processing unit 146 includes a real-time processing unit 164, a quasi-real-time processing unit 166, and a non-real-time processing unit 168. In a case where the delay time of the sensor information inputted to the filter unit 162 is small (for example, approximately smaller than 1 second), the filter unit 162 inputs the sensor information to input buffers (left-side blocks indicated by broken lines in FIG. 5) respectively corresponding to the real-time processing unit 164, the quasi-real-time processing unit 166, and the non-real-time processing unit 168. In a case where the delay time of the sensor information inputted to the filter unit 162 is slightly great (for example, approximately 1 second or greater but smaller than several seconds), the filter unit 162 inputs the sensor information to the input buffers respectively corresponding to the quasi-real-time processing unit 166 and the non-real-time processing unit 168. In a case where the delay time of the sensor information inputted to the filter unit 162 is great (for example, several seconds or greater but smaller than several minutes), the filter unit 162 inputs the sensor information to the input buffer corresponding to the non-real-time processing unit 168. In a case where the delay time of the sensor information inputted to the filter unit 162 is further great (for example, several minutes or greater), the filter unit 162 discards the sensor information. The function of the filter unit 162 is implemented by the control unit 140. Partial areas of the memory 142 are used as the respective input buffers of the real-time processing unit 164, the quasi-real-time processing unit 166, and the non-real-time processing unit 168.

The real-time processing unit 164 processes sensor information having a small delay time. The real-time processing unit 164 reads sensor information from the corresponding input buffer, performs a moving object detection process thereon, and stores information (analysis result) specifying a detected object in association with acquisition time t1 of the sensor information, in a corresponding output buffer (right-side block indicated by a broken line in FIG. 5). For example, if the sensor information is moving image data taken by a digital camera, an object can be detected by, for example, calculating the difference between consecutive frames. Thus, the server can perform the moving object processing on sensor information that has a small delay time and is suitable for moving object detection.

The quasi-real-time processing unit 166 processes sensor information having a small delay time and sensor information having a slightly great delay time, together. The quasi-real-time processing unit 166 reads sensor information from the corresponding input buffer, executes an estimation process, and stores a result thereof in association with acquisition time t1 of the sensor information, in a corresponding output buffer. For example, the quasi-real-time processing unit 166 processes the sensor information in the same manner as the real-time processing unit 164, to detect an object, and estimates the attribute (e.g., in a case where a pedestrian is detected, what the pedestrian is like (e.g., a child, an old person, a walking person, a stopped person, or the like)) of the detected object. Thus, the server can perform the estimation processing on sensor information having a slightly great delay time about the detected object, in addition to sensor information having a small delay time.

The non-real-time processing unit 168 processes sensor information having a small delay time, sensor information having a slightly great delay time, and sensor information having a great delay time, together. The non-real-time processing unit 168 reads sensor information from the corresponding input buffer, and using also the analysis result (moving object detection result) from the real-time processing unit 164, executes a known statistical process such as statistical analysis. The real-time processing unit 164 stores a result of the analysis in association with acquisition time t1 of the sensor information, in a corresponding output buffer. Thus, the server can perform the statistical processing on sensor information having a comparatively great delay time, in addition to sensor information having a small delay time and sensor information having a slightly great delay time about the detected object. It is noted that partial areas of the memory 142 are used as the respective output buffers of the real-time processing unit 164, the quasi-real-time processing unit 166, and the non-real-time processing unit 168.

The synchronous processing unit 170 reads data (analysis results and acquisition times t1 of sensor information) from the output buffers respectively corresponding to the real-time processing unit 164, the quasi-real-time processing unit 166, and the non-real-time processing unit 168, at a predetermined timing, and groups the analysis results for which the acquisition times t1 are close to each other, into one group. The grouped results are outputted to the integration processing unit 172. A reference for determining the timing of executing this process may be set as appropriate. For example, whether or not the predetermined timing has come is determined through determination for whether or not the processing results from the analysis processing unit 146 stored in the memory 142 (output buffers) have reached a predetermined capacity. Alternatively, whether or not the predetermined timing has come may be determined through determination for whether or not the number of times the processing result of the analysis processing unit 146 is stored in the memory 142 has reached a predetermined number of times. Still alternatively, whether or not the predetermined timing has come may be determined through determination for whether or not the time period of storing the processing results of the analysis processing unit 146 in the memory 142 has reached a predetermined time period.

The integration processing unit 172 integrates each group of data inputted from the synchronous processing unit 170, and stores the result thereof as an integrated result in a predetermined area of the memory 142. The integrated result is read by the packet transmission unit 174 as appropriate, and is formed into packet data in accordance with a communication format. Then, the packet data is transmitted as driving support information to the on-vehicle device of the vehicle. The functions of the synchronous processing unit 170 and the integration processing unit 172 are implemented by the control unit 140. Owing to the synchronous processing unit 170 and the integration processing unit 172, the server can provide more appropriate driving support information to the on-vehicle device.

Operation

Figure 6:
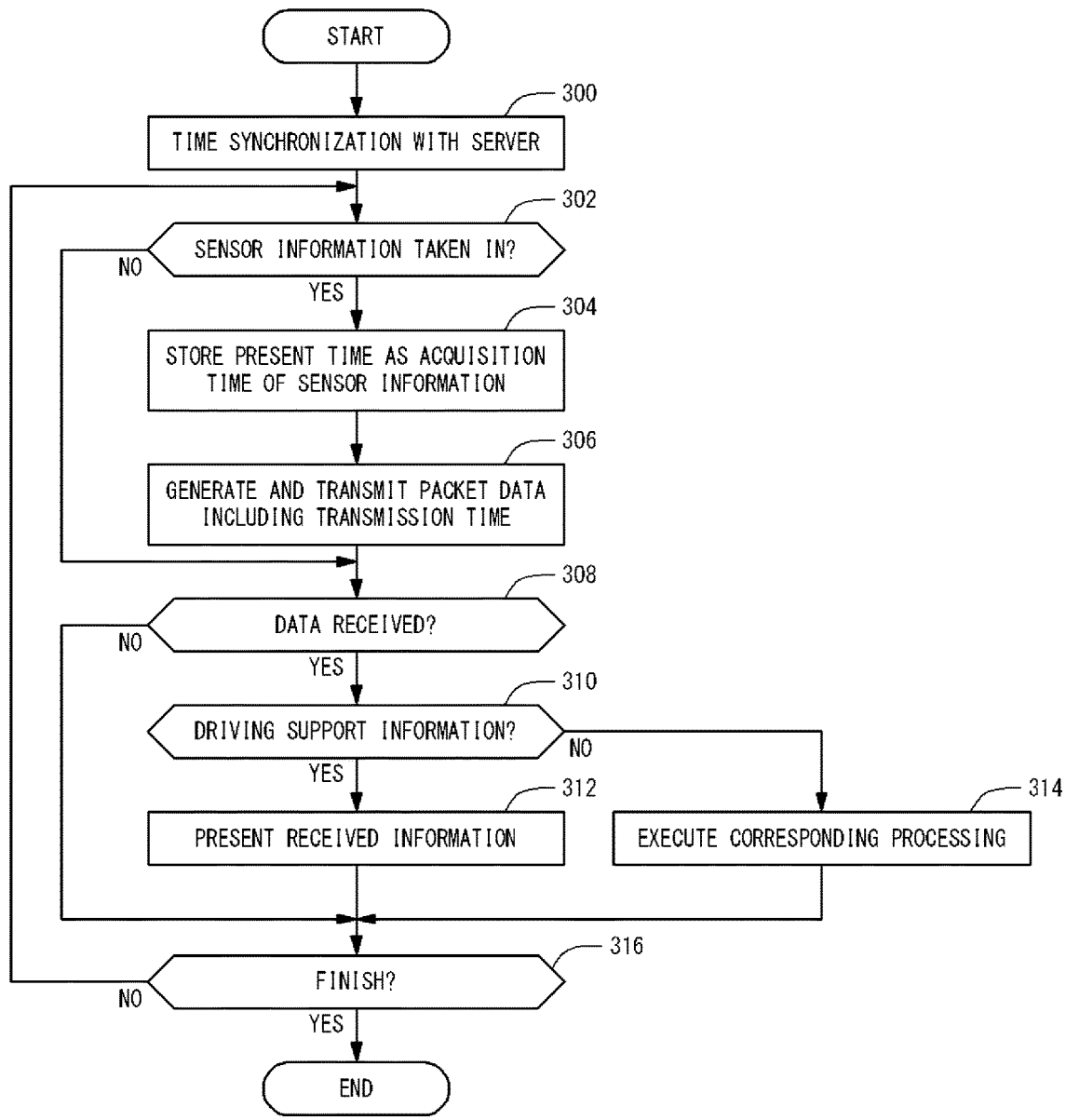
FIG. 6 is a flowchart showing operation of the on-vehicle device.
Figure 7:
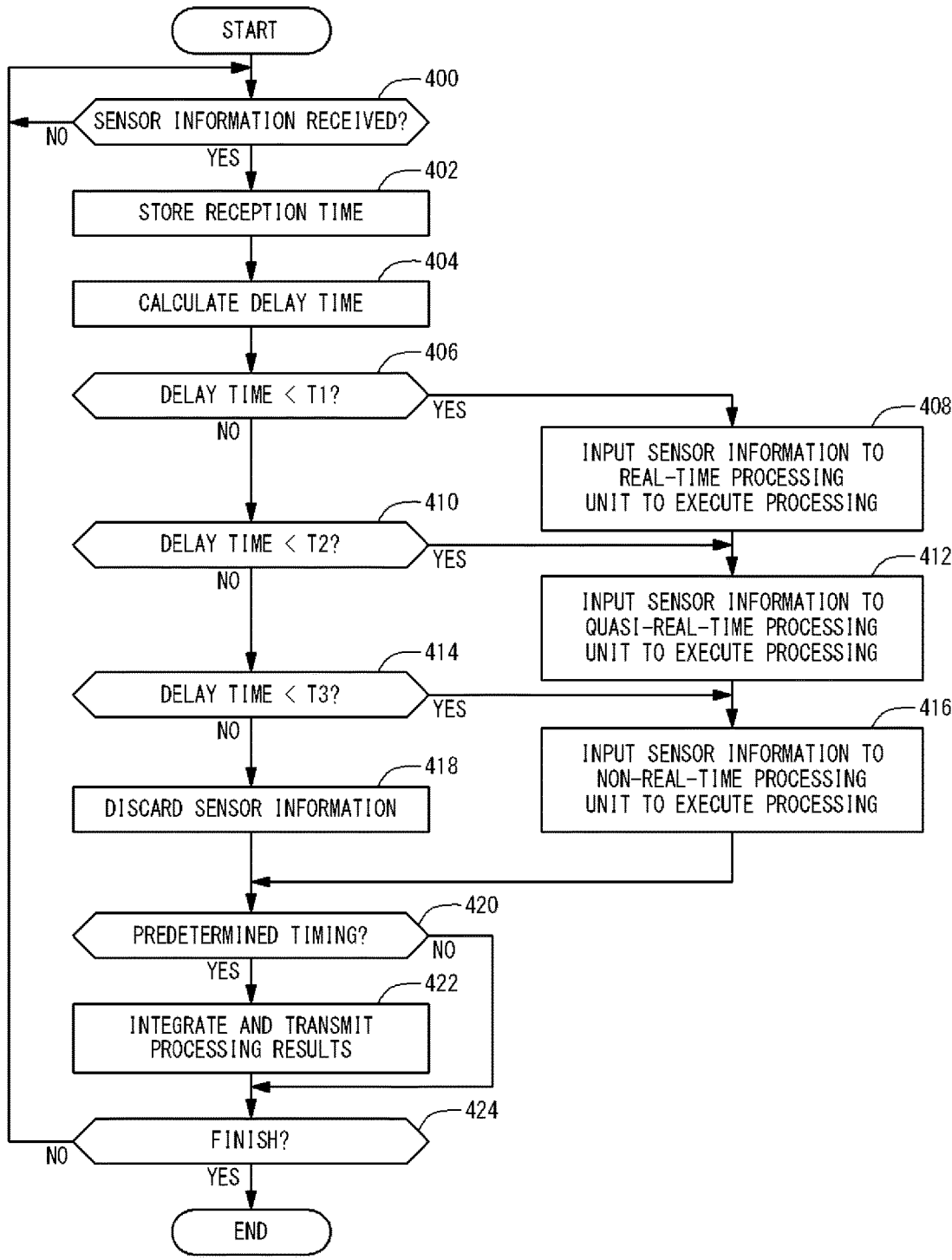
FIG. 7 is a flowchart showing operation of the server.

With reference to FIG. 6 and FIG. 7, operation of the driving support system 100 will be described by describing operations of the on-vehicle device 120 of the first vehicle 108 and the server 102. The process shown in FIG. 6 is implemented by the control unit 130 reading a predetermined program from the memory 128 and executing the same. The process shown in FIG. 7 is implemented by the control unit 140 reading a predetermined program from the memory 142 and executing the same.

Here, in the on-vehicle device 120, it is assumed that the I/F unit 124 acquires sensor information continuously outputted from the sensor device 122 and stores the sensor information in the memory 128, and sends a predetermined signal (hereinafter, referred to as take-in completion signal) indicating that the sensor information has been acquired, to the control unit 130 at a predetermined timing. For example, every time the I/F unit 124 stores a predetermined amount of the sensor information in the memory 128, the I/F unit 124 sends a take-in completion signal to the control unit 130. The structure of packet data including sensor information to be transmitted from the on-vehicle device 120 to the server 102 corresponds to a predetermined format, and is known by the server 102 (for example, the format is stored in the memory 142). The structure of packet data including driving support information to be transmitted from the server 102 to the on-vehicle device 120 corresponds to a predetermined format, and is known by the on-vehicle device 120 (for example, the format is stored in the memory 128).

Operation of On-Vehicle Device

With reference to FIG. 6, in step 300, the control unit 130 performs processing (hereinafter, referred to as time synchronization) of matching the timer 132 with the timer 148 of the server 102. For example, the control unit 130 acquires the present time from a known NTP server which provides time information on the Internet, and sets the timer 132 accordingly. If the control unit 140 adjusts the time of the timer 148 in the same manner, the times of the timer 132 of the on-vehicle device 120 and the timer 148 of the server 102 can be synchronized with each other.

It is noted that such time synchronization may be realized by any method. For example, in a case where the vehicle 108 is provided with a car navigation device, the control unit 130 may acquire the present time from GPS radio waves received by the car navigation device, to set the timer 132 accordingly. In a case where the on-vehicle device 120 has a function of receiving a standard radio signal with which time information is transmitted, the control unit 130 may set the timer 132 at the present time specified by the standard radio signal. Alternatively, the on-vehicle device 120 may perform time synchronization by directly asking the server 102 about the present time. In this case, it is preferable that delay due to the line speed is taken into consideration.

In step 302, the control unit 130 determines whether or not sensor information is taken in. Specifically, the control unit 130 determines whether or not a take-in completion signal is sent from the I/F unit 124. If it is determined that the take-in completion signal is received (i.e., sensor information is taken in), the control proceeds to step 304. Otherwise, the control proceeds to step 308.

In step 304, the control unit 130 acquires the present time from the timer 132, and stores the present time as the acquisition time t1 of the sensor information in a predetermined area of the memory 128 in association with the sensor information. Thereafter, the control proceeds to step 306. For example, the acquisition time t1 is stored in a predetermined format so as to follow the corresponding sensor information.

In step 306, the control unit 130 reads the sensor information and the acquisition time t1 corresponding thereto from the memory 128, and generates packet data in a format corresponding to the present communication line. Further, the control unit 130 reads the present time from the timer 132, incorporates the present time as transmission time t2 into the packet data, and transmits the packet data to the server 102 via the communication unit 126. Thereafter, the control proceeds to step 308. The packet data to be transmitted here preferably includes a predetermined code (a code indicating that sensor information is included; hereinafter, referred to as sensor information code) prescribed in advance in relation with the server 102. For example, the packet data to be transmitted includes a set of {s1, t1, t2, c1}. Here, s1 is the sensor information, and c1 is the sensor information code.

In a case where the data amount of the sensor information to be transmitted is large so that the sensor information cannot be transmitted with one packet data, the acquisition time t1 and the transmission time t2 may be incorporated in at least one (e.g., packet data to be transmitted first or last) of a plurality of packet data including divided pieces of the sensor information. The server 102 generates (reproduces) the sensor information from the plurality of packet data received, and thus can specify the acquisition time t1 and the transmission time t2 corresponding thereto. Instead of transmitting information directly indicating time, information relevant to time (information that is data or the like obtained by converting time in accordance with a predetermined rule, and allows the time to be reproduced therefrom) may be transmitted. The server 102 only has to be configured in advance to be able to execute a process for generating the original time from the received information.

In step 308, the control unit 130 determines whether or not data has been received by the communication unit 126. If it is determined that data has been received, the control proceeds to step 310. Otherwise, the control proceeds to step 316.

In step 310, the control unit 130 determines whether or not the data received in step 308 includes driving support information. If it is determined that the data includes driving support information, the control proceeds to step 312. Otherwise, the control proceeds to step 314. For example, if the server 102 transmits a predetermined code in addition to the packet data including the driving support information at the time of transmission thereof, the control unit 130 can determine whether or not packet data including driving support information has been received, through determination for whether or not the code is included therein.

In step 312, the control unit 130 presents the received driving support information. Thereafter, the control proceeds to step 316. The presentation may be performed in any manner. For example, the driving support information is displayed in a form of an image, characters, or the like on a display portion of a car navigation device. Some of the driving support information may be presented as a sound. In a case where the driving support information cannot be presented as it is, the driving support information may be subjected to a predetermined process and a result thereof may be presented.

In step 314, the control unit 130 executes a predetermined process in accordance with the received packet data. For example, the control unit 130 passes the received data to a predetermined application program. Thereafter, the control proceeds to step 316.

In step 316, the control unit 130 determines whether or not a finish instruction is made. The finish instruction is made by powering off the on-vehicle device 120, for example. If it is determined that the finish instruction is made, this program is finished. Otherwise, the control returns to step 302.

As described above, every time sensor information including an object detected by the sensor device 122 is stored in the memory 128 by the I/F unit 124, the on-vehicle device 120 can transmit packet data including the sensor information, and the acquisition time t1 and the transmission time t2 thereof, to the server 102. The on-vehicle device 152 of the second vehicle 110 and the roadside device 112 which have the same configuration as in FIG. 3 can also perform the same process as that shown in the flowchart in FIG. 6. That is, every time sensor information including an object detected by a sensor is stored in a memory, also the on-vehicle device 152 and the roadside device 112 can transmit packet data including the sensor information, and the acquisition time t1 and the transmission time t2 thereof, to the server 102.

Operation of Server

With reference to FIG. 7, in step 400, the control unit 140 determines whether or not sensor information has been received. Specifically, when the control unit 140 has received packet data, the control unit 140 determines whether or not a sensor information code c1 is included in the packet data. If it is determined that the sensor information code c1 is included (i.e., sensor information has been received), the control proceeds to step 402. Otherwise, step 400 is repeated.

In step 402, the control unit 140 acquires the present time from the timer 148, and stores the present time as reception time t3 of the data in a predetermined area of the memory 142.

In step 404, the control unit 140 calculates a delay time on the basis of time information included in the data received in step 400. Thereafter, the control proceeds to step 406. As described above, a set of {s1, t1, t2, c1} is included in the packet including sensor information transmitted from each of the on-vehicle device 120 of the first vehicle 108, the on-vehicle device 152 of the second vehicle 110, and the roadside device 112. Specifically, the control unit 140 reads the reception time t3 from the memory 142, and subtracts the acquisition time t1 included in the received data from the reception time t3, to calculate a delay time (t3−t1). In a case where the received data includes information relevant to time instead of information directly indicating time, the control unit 140 may generate the original time from the received information relevant to time and calculate a delay time as described above.

In step 406, the control unit 140 determines whether or not the delay time (t3−t1) calculated in step 404 is smaller than a predetermined first threshold T1. If it is determined that the delay time is smaller than the first threshold T1, the control proceeds to step 408. Otherwise, the control proceeds to step 410. The first threshold T1 may be set in advance. The first threshold T1 is a threshold for determining whether or not to be subjected to a process by the real-time processing unit 164 (e.g., moving object detection process), as described later. Thus, the first threshold T1 can also be said to be a moving object processing threshold, and can be set to about 1 second, for example.

In step 408, the control unit 140 reads the sensor information received in step 400, from the memory 142, and inputs the sensor information to the input buffer of the real-time processing unit 164. Thereafter, the control proceeds to step 412. Thus, as described above, the real-time processing unit 164 executes a predetermined process (e.g., moving object detection process), and stores a result thereof in the output buffer (memory 142) in association with the acquisition time t1.

In step 410, the control unit 140 determines whether or not the delay time (t3−t1) calculated in step 404 is smaller than a predetermined second threshold T2. If it is determined that the delay time is smaller than the second threshold T2, the control proceeds to step 412. Otherwise, the control proceeds to step 414. The second threshold T2 may be set in advance. The second threshold T2 is a threshold for determining whether or not to be subjected to a process by the quasi-real-time processing unit 166 (e.g., estimation process), as described later. Thus, the second threshold T2 can also be said to be an estimation processing threshold, and can be set to about several seconds (a value in a range of about 4 to 6 seconds), for example.

In step 412, the control unit 140 reads the sensor information received in step 400, from the memory 142, and inputs the sensor information to the input buffer of the quasi-real-time processing unit 166. Thereafter, the control proceeds to step 416. Thus, as described above, the quasi-real-time processing unit 166 executes a predetermined process (e.g., estimation process), and stores a result thereof in the output buffer (memory 142) in association with the acquisition time t1.

In step 414, the control unit 140 determines whether or not the delay time (t3−t1) calculated in step 404 is smaller than a predetermined third threshold T3. If it is determined that the delay time is smaller than the third threshold T3, the control proceeds to step 416. Otherwise, the control proceeds to step 418. The third threshold T3 may be set in advance. The third threshold T3 is a threshold for determining whether or not to be subjected to a process by the non-real-time processing unit 168 (e.g., statistical analysis process), as described later. Thus, the third threshold T3 can also be said to be a statistical processing threshold, and can be set to several minutes (a value in a range of about 4 to 6 minutes), for example.

In step 416, the control unit 140 reads the sensor information received in step 400, from the memory 142, and inputs the sensor information to the input buffer of the non-real-time processing unit 168. Thereafter, the control proceeds to step 420. Thus, as described above, the non-real-time processing unit 168 executes a predetermined process (e.g., statistical analysis process), and stores a result thereof in the output buffer (memory 142) in association with the acquisition time t1.

In step 418, the control unit 140 discards the sensor information received in step 400. Specifically, the control unit 140 deletes the latest sensor information received in step 400 and stored in the memory 142. Thereafter, the control proceeds to step 420.

In step 420, the control unit 140 determines whether or not a predetermined timing has come. This corresponds to the processing by the synchronous processing unit 170 described above. It is noted that, after the control unit 140 transmits driving support information in step 422 described later, the subsequent processing results of steps 408, 412, and 416 that are stored from the next time are treated as targets of timing determination. If it is determined that the predetermined timing has come, the control proceeds to step 422. Otherwise, the control proceeds to step 424.

In step 422, regarding the processing results of steps 408, 412, and 416 repeatedly executed, which are stored in the memory 142, the control unit 140 groups the processing results for which the acquisition times t1 are within a predetermined value, into one group, integrates the processing results in each group, and transmits the integrated processing results as driving support information to the on-vehicle device. Thereafter, the control proceeds to step 424.

In step 424, the control unit 140 determines whether or not a finish instruction is made. The finish instruction is made by an instruction for stopping the program being executed, for example. If the finish instruction is received, the present program is finished. If the finish instruction has not been received, the control returns to step 400.

As described above, the on-vehicle device 120 of the first vehicle 108 and the roadside device 112 have communication functions using 5G line. Therefore, the communication speed thereof is great, a communication period for the sensor information that the server 102 has received from the on-vehicle device 120 (information about, for example, the detection object 114 detected by the sensors of the first vehicle 108 and the roadside device 112) is comparatively short, and the delay time thereof is comparatively small. On the other hand, the on-vehicle device 152 of the second vehicle 110 has a communication function using LTE line, but does not have a communication function using 5G line. Therefore, a communication period for sensor information that the server 102 has received from the on-vehicle device 152 (information about, for example, the detection object 114 detected by the sensor of the second vehicle 110) is comparatively long, and the delay time thereof is comparatively great. Even in such a case, every time the server 102 receives packet data including sensor information, the server 102 can execute appropriate processing among step 408, step 412, and step 416 in accordance with the delay time from when the sensor information has been acquired until the sensor information is received by the server 102, and can store a result thereof in the memory 142. Then, using these processing results, the server 102 can generate driving support information with high accuracy. It is noted that the above values of the first to third thresholds T1 to T3 are merely examples, and the first to third thresholds T1 to T3 are not limited thereto. Values other than the above may be used.

Effects

For sensor information to be transmitted from the on-vehicle device and the roadside device, the acquisition time t1 of the sensor information is added and transmitted together to the server 102. Therefore, the server 102 that has received this can execute appropriate processing in accordance with the delay time from when the sensor information has been acquired until the sensor information is received by the server 102, and using a result thereof, can generate driving support information with high accuracy. Then, the driving support information with high accuracy is provided to the on-vehicle device of each vehicle, whereby the driver can be further supported and reliability of the driving support system 100 can be improved.

In the above description, the transmission time t2 added to the sensor information by the on-vehicle device 120 is not used by the server 102. However, as shown with reference to FIG. 1, the delay time from a time at which the sensor device has detected an object (hereinafter, referred to as sensing time) until the sensor information is received by the server 102 can include delay times due to a plurality of factors. Therefore, the transmission time t2 can be used for evaluation of the delay factors. For example, in such a case where the delay time increases, the transmission time t2 can be used for specifying which factor greatly contributes to this.

Modifications

Operation of Server in Modification

In the above description, the case where the real-time processing unit 164, the quasi-real-time processing unit 166, and the non-real-time processing unit 168 of the analysis processing unit 146 each execute the corresponding processing when sensor information is inputted to the corresponding input buffer, has been shown, but another configuration is also applicable. In the server 102, after a process of classifying received sensor information in accordance with delay times by the filter unit 162 is executed during a predetermined period, plural pieces of sensor information stored in the input buffers may be collectively processed by the real-time processing unit 164, the quasi-real-time processing unit 166, and the non-real-time processing unit 168. Assuming that the functional configuration of the server 102 is the same as that shown in FIG. 5, the server 102 may execute a process shown in FIG. 8, for example.

Figure 8:
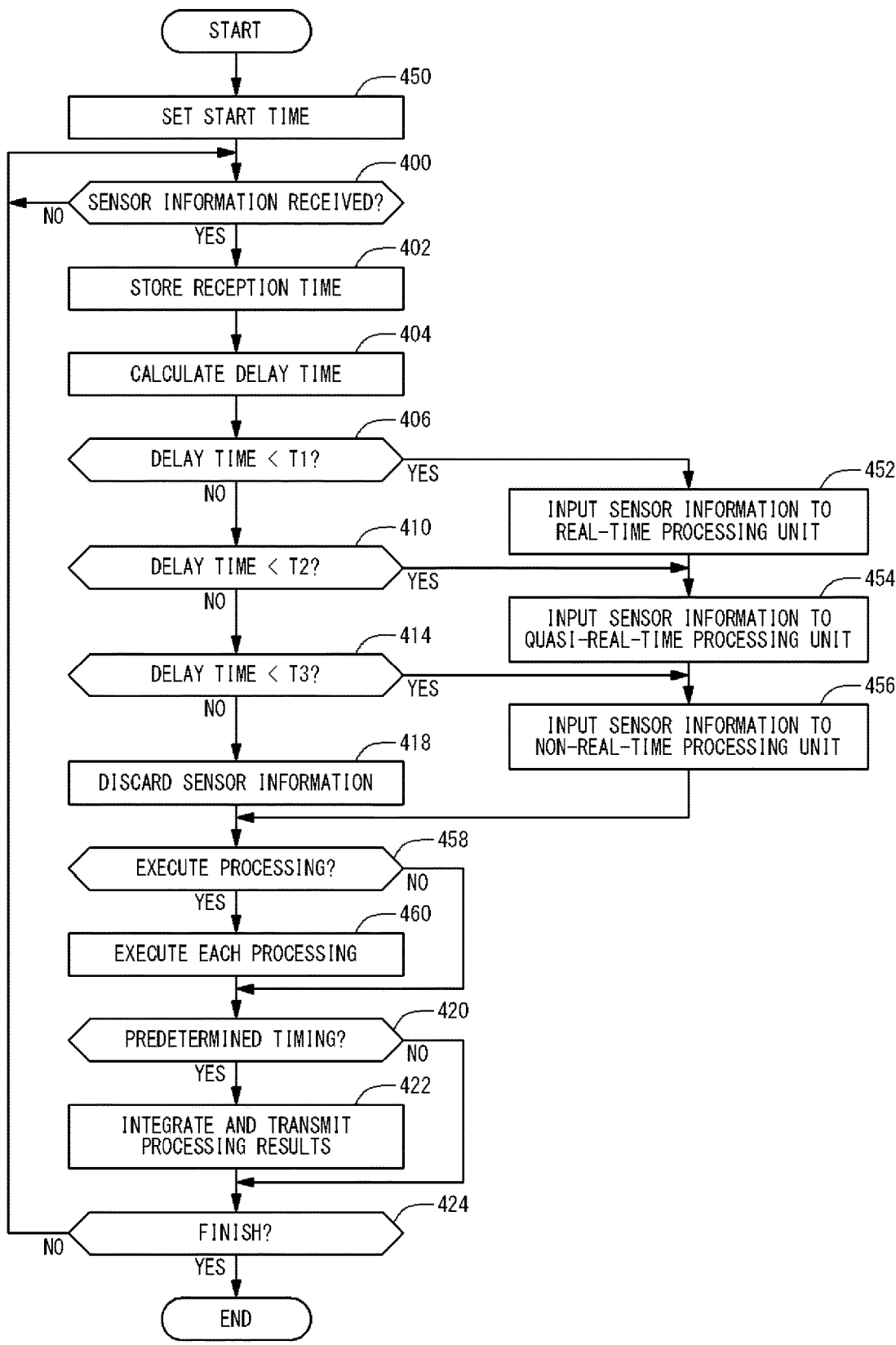
FIG. 8 is a flowchart showing operation of the server different from that in FIG. 7.

The flowchart in FIG. 8 is obtained by, in the flowchart in FIG. 7, adding step 450 before step 400, replacing steps 408, 412, and 416 with steps 452, 454, and 456, respectively, and adding new steps 458 and 460 between step 418 and step 420. In FIG. 8, processing of the step denoted by the same number as in FIG. 7 is the same as the step in FIG. 7.

Therefore, description thereof will not be repeated and different points will be mainly described.

With reference to FIG. 8, in step 450, the control unit 140 acquires the present time from the timer 148, and stores the present time as a start time in a predetermined area of the memory 142. Thereafter, the control proceeds to step 400.

Steps 400 to 404 are executed, and then, if a result of determination in step 406 is YES (delay time is smaller than the first threshold T1), in step 452, the control unit 140 reads the sensor information and the acquisition time t1 received in step 400, from the memory 142, and inputs the sensor information and the acquisition time t1 to the input buffer of the real-time processing unit 164. Thereafter, the control proceeds to step 454. Unlike step 408 in FIG. 7, the processing by the real-time processing unit 164 is not executed.

If a result of determination in step 410 is YES (delay time is smaller than the second threshold T2), in step 454, the control unit 140 reads the sensor information and the acquisition time t1 received in step 400, from the memory 142, and inputs the sensor information and the acquisition time t1 to the input buffer of the quasi-real-time processing unit 166. Thereafter, the control proceeds to step 456. Unlike step 412 in FIG. 7, the processing by the quasi-real-time processing unit 166 is not executed.

If a result of determination in step 414 is YES (delay time is smaller than the third threshold T3), in step 456, the control unit 140 reads the sensor information and the acquisition time t1 received in step 400, from the memory 142, and inputs the sensor information and the acquisition time t1 to the input buffer of the non-real-time processing unit 168. Thereafter, the control proceeds to step 458. Unlike step 416 in FIG. 7, the processing by the non-real-time processing unit 168 is not executed.

Thereafter, in step 458, the control unit 140 determines whether or not to execute the processing by the real-time processing unit 164, the quasi-real-time processing unit 166, and the non-real-time processing unit 168. Specifically, the control unit 140 acquires the present time from the timer 148, reads the start time stored in the memory 142 in step 450, and determines whether or not a predetermined period has elapsed since the start time. If it is determined that the predetermined period has elapsed, the control proceeds to step 460. Otherwise, the control proceeds to step 420. Thus, until the predetermined period elapses (as long as the timing to integrate processing results has not come and a finish instruction has not been made), processing of storing the received sensor information in the input buffers of the real-time processing unit 164 to the non-real-time processing unit 168 in accordance with the delay times of the received sensor information is repeatedly executed. It is noted that the predetermined period may be set to an appropriate value so that an analysis result of the real-time processing unit 164 is not wasted (i.e., the real-time property is not lost).

In step 460, the control unit 140 causes each of the real-time processing unit 164, the quasi-real-time processing unit 166, and the non-real-time processing unit 168 to execute the processing described above. In addition, the control unit 140 acquires the present time from the timer 148 and overwrites the start time stored in the memory 142, with the present time. Thus, the newly set start time becomes a reference for determining whether or not to execute the processing of step 460.

As described above, the server 102 executes analysis processing by the real-time processing unit 164, the quasi-real-time processing unit 166, and the non-real-time processing unit 168 for the sensor information and the acquisition times t1 accumulated during a predetermined period, whereby accuracy of obtained analysis results can be improved. Thus, accuracy of driving support information generated therefrom can be improved.

In the above description, the case where packet data including the acquisition time t1 of sensor information is transmitted from the on-vehicle device 120 to the server 102, has been described, but another configuration is also applicable. Normally, a period (reaction period) from the sensing time of the sensor to a time at which a signal is outputted from the sensor device, is short. Therefore, the influence on the delay time is small, and the acquisition time t1 can be considered to be the same as the sensing time. However, depending on the sensor device, it is conceivable that the reaction period influences the delay time to a certain extent. In such a case, for the purpose of further improving accuracy, it is preferable to use the sensing time of the sensor instead of the acquisition time t1.

A response period $\tau$ of the sensor is almost constant in each type of sensors. Therefore, for example, if the response period $\tau$ for each type of on-vehicle sensors is stored in advance in the memory 128, the control unit 130 can calculate a sensing time t0 ($=t1-\tau$) by subtracting the response period T from the acquisition time t1 of the sensor information, and can set the sensing time t0, instead of the acquisition time t1, for the packet data including sensor information to be transmitted to the server 102 (see steps 304 and 306 in FIG. 6). When the server 102 has received the packet data, the server 102 may execute the processing from step 406 in FIG. 7, using a value obtained by subtracting the sensing time t0 from the reception time t3, as the delay time (t3−t0). Thus, the server can accurately calculate the delay time of each received sensor information, and can more appropriately classify and analyze the sensor information.

Figure 9:
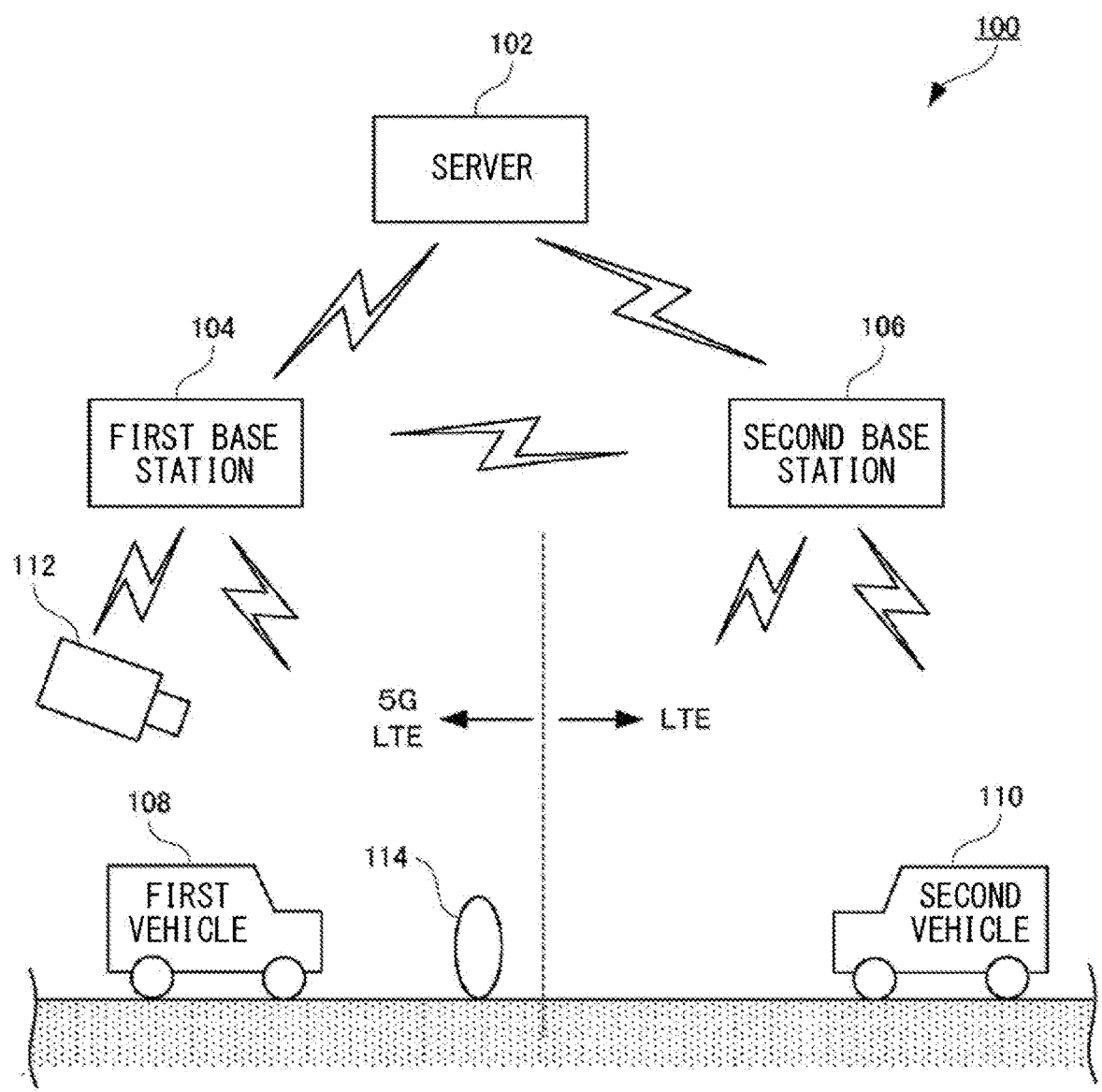
FIG. 9 is a schematic diagram showing a situation of the driving support system different from that in FIG. 2.

In the above description, the case where the on-vehicle devices of the first vehicle 108 and the second vehicle 110 are different in communication performance with respect to the first base station 104, has been shown. However, a situation in which a delay time issue arises is not limited to such a case. For example, a delay time issue also arises in a case as shown in FIG. 9. FIG. 9 shows a case where an operation situation of the driving support system 100 is different from FIG. 2. The first base station 104 provides services by LTE line and 5G line as in the case of FIG. 2. On the other hand, a second base station 106 provides a communication service by LTE line but does not provide a communication service by 5G line. That is, the left side with respect to a broken line in FIG. 9 is a service area (hereinafter, may be referred to as 5G area) based on 5G line, and the right side is a service area (hereinafter, may be referred to as LTE area) based on LTE line. The on-vehicle devices mounted on the first vehicle 108 and the second vehicle 110 each have communication functions using LTE line and 5G line. While traveling in the 5G area, each of the first vehicle 108 and the second vehicle 110 can perform high-speed communication using 5G line with the server 102, so that the delay time in transmitting sensor information is small, but when moving out of the 5G area (still being in the LTE area), each vehicle can perform only communication using LTE line, and thus the communication speed is reduced and the delay time becomes great. Also in such a case, the driving support system 100 effectively operates. That is, when the server 102 has received packet data including sensor information, the server 102 can execute appropriate processing among step 408, step 412, and step 416 in accordance with the delay time from the sensing time or the acquisition time to the reception time of the server 102, and store a result thereof in the memory 142. Then, using processing results thereof, the server 102 can generate driving support information with high accuracy.

In the above description, the case where processes to be performed in accordance with the delay time are the real-time process, the quasi-real-time process, and the non-real-time process, has been shown, but another configuration is also applicable. A process of which the processing content is preferably changed in accordance with the delay time from the sensing time of the sensor or the acquisition time of sensor information, can be applied, and a process other than the above processes may be applied. In addition, the number of such different processes may be two or more.

In the above description, the case where the server 102 calculates a delay time (t3–t1 or t3–t0) using the reception time of sensor information, has been shown, but another configuration is also applicable. The server 102 can obtain the delay time by calculating the communication period from the line speed, summing the transmission time t2 added to sensor information and the communication period, and then subtracting the acquisition time t1 or the sensing time t0 from the sum. The communication period (second) can be calculated by dividing the data size (in a unit of bit, for example) of the received packet by the line speed (in a unit of bit per second (bps), for example).

In the above description, the case where the acquisition time t1 of sensor information or the sensor sensing time t0 thereof is transmitted together with the sensor information from the on-vehicle device and the roadside device to the server, and then, in accordance with the delay time calculated therefrom, a different process is executed on the sensor information, has been shown, but another configuration is also applicable. A reference for determining which of different processes is to be executed on the sensor information, may be information relevant to the delay time. For example, the server 102 may execute different processes on sensor information in accordance with the type (5G, LTE, 3G, etc.) of the communication line with the counterpart (on-vehicle device or roadside device) that transmits the sensor information. Among factors that can cause a delay time, normally, delay due to a communication period is great, and the delay time differs depending on the type of the line. Therefore, the type of the line can be said to approximately correspond to the delay time. That is, the on-vehicle device and the roadside device may transmit sensor information together with the type of the communication line, to the server.

While the present invention has been described through description of embodiments above, the above embodiments are merely illustrative and the present invention is not limited to only the above embodiments. The scope of the present invention is defined by each claim of the scope of claims with reference to the above description, and includes meanings equivalent to the wordings described therein and all modifications within the scope of claims.

REFERENCE SIGNS LIST

100 driving support system
102 server
104 first base station
106 second base station
108 first vehicle
110 second vehicle
112 roadside device
114 detection object
120, 152 on-vehicle device
122 sensor device
124 I/F unit
126, 144 communication unit
128, 142 memory
130, 140 control unit
132, 148 timer
134, 150 bus
146 analysis processing unit
160 packet reception unit
162 filter unit
164 real-time processing unit
166 quasi-real-time processing unit
168 non-real-time processing unit
170 synchronous processing unit
172 integration processing unit
174 packet transmission unit

The invention claimed is:

1. A system comprising:
one or a plurality of sensors correspondingly connected to each of a plurality of devices;
a reception unit configured to receive sensor information corresponding to a detection signal of each of the one or plurality of sensors, the sensor information being transmitted from the plurality of devices;
a plurality of processing units configured to process the sensor information received by the reception unit; and
a control unit configured to input the sensor information received by the reception unit, to any of the plurality of processing units, on the basis of information about delay in communication of the sensor information.

2. The system according to claim 1, wherein
the information about the delay includes: at least one of information about a sensing time of the sensor and information about an acquisition time of the sensor information by the device to which the sensor is connected; and information about a reception time by the reception unit.

3. The system according to claim 1, wherein
the information about the delay further includes information about an acquisition time of the sensor information by the device to which the sensor is connected and information about a transmission time of the sensor information from the device to the reception unit.

4. The system according to claim 1, wherein
the plurality of processing units include a moving object processing unit for detecting a moving object from the sensor information, and another processing unit, and
the control unit compares the information about the delay with a moving object processing threshold, and determines, on the basis of a result of the comparison, whether to input the sensor information to the moving object processing unit or to the processing unit other than the moving object processing unit.

5. The system according to claim 1, wherein
the plurality of processing units include an estimation processing unit for estimating an attribute of an object detected from the sensor information, and another processing unit, and
the control unit compares the information about the delay with an estimation processing threshold, and determines, on the basis of a result of the comparison, whether to input the sensor information to the estimation processing unit or to the processing unit other than the estimation processing unit.

6. The system according to claim 1, wherein
the plurality of processing units include a statistical processing unit for statistically analyzing the sensor information, and another processing unit, and
the control unit compares the information about the delay with a statistical processing threshold, and determines, on the basis of a result of the comparison, whether to input the sensor information to the statistical processing unit or to the processing unit other than the statistical processing unit.

7. The system according to claim 1, wherein
the plurality of devices include at least one of an on-vehicle device and a roadside device.

8. The system according to claim 1, further comprising a synchronous processing unit configured to group, among processing results of the plurality of processing units, the processing results for which sensing times of the sensors corresponding to the processing results or acquisition times of sensor information corresponding to the processing results are close to each other, into one group, in order to perform integration processing for the processing results of the plurality of processing units.

9. A control method for controlling processing for sensor information from one or a plurality of sensors correspondingly connected to each of a plurality of devices, the control method comprising:
a reception step of receiving sensor information corresponding to a detection signal of each of the one or plurality of sensors, the sensor information being transmitted from the plurality of devices;
a plurality of processing steps of processing the sensor information received in the reception step; and
a control step of inputting the sensor information received in the reception step, to any of the plurality of processing steps, on the basis of information about delay in communication of the sensor information.

10. A server computer that communicates with a plurality of devices, the plurality of devices each including one or a plurality of sensors connected thereto, the server computer comprising:
a reception unit configured to receive sensor information corresponding to a detection signal of each of the one or plurality of sensors, the sensor information being transmitted from the plurality of devices;
a plurality of processing units configured to process the sensor information received by the reception unit; and
a control unit configured to input the sensor information received by the reception unit, to any of the plurality of processing units, on the basis of information about delay in communication of the sensor information.

11. A non-transitory computer readable storage medium storing a computer program for causing a server computer that communicates with a plurality of devices each having one or a plurality of sensors, to implement:
a reception function of receiving sensor information corresponding to a detection signal of each of the one or plurality of sensors, the sensor information being transmitted from the plurality of devices;
a plurality of processing functions of processing the sensor information received by the reception function; and
a control function of inputting the sensor information received by the reception function, to any of the plurality of processing functions, on the basis of information about delay in communication of the sensor information.

* * * * *